United States Patent
Onishi

(10) Patent No.: US 9,976,647 B2
(45) Date of Patent: May 22, 2018

(54) VEHICULAR SHIFT APPARATUS

(71) Applicant: FUJI KIKO CO., LTD., Kosai-shi, Shizuoka (JP)

(72) Inventor: Koji Onishi, Hamamatsu (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days. days.

(21) Appl. No.: 15/446,216

(22) Filed: Mar. 1, 2017

(65) Prior Publication Data
US 2017/0268656 A1 Sep. 21, 2017

(30) Foreign Application Priority Data
Mar. 18, 2016 (JP) ................................ 2016-054675

(51) Int. Cl.
*F16H 59/08* (2006.01)
*F16H 59/10* (2006.01)
*G01D 5/14* (2006.01)
*F16H 59/02* (2006.01)

(52) U.S. Cl.
CPC ........... *F16H 59/105* (2013.01); *F16H 59/08* (2013.01); *G01D 5/145* (2013.01); *F16H 2059/0295* (2013.01); *F16H 2059/081* (2013.01)

(58) Field of Classification Search
None
See application file for complete search history.

(56) References Cited

U.S. PATENT DOCUMENTS

| | | | | |
|---|---|---|---|---|
| 5,729,007 A | * | 3/1998 | Taniguchi | ............. F16H 59/105 250/231.13 |
| 7,441,474 B2 | * | 10/2008 | Kliemannel | ........ F16H 59/0204 340/456 |
| 8,087,317 B2 | * | 1/2012 | Easton | .................. F02N 11/103 477/99 |
| 9,671,212 B2 | * | 6/2017 | Iwata | ...................... F16H 59/04 |
| 2014/0020495 A1 | | 1/2014 | Iwata | |

FOREIGN PATENT DOCUMENTS

| JP | 2014-20922 A | 2/2014 |
|---|---|---|
| JP | 2014-31149 A | 2/2014 |

* cited by examiner

*Primary Examiner* — Dirk Wright
(74) *Attorney, Agent, or Firm* — Foley & Lardner LLP

(57) ABSTRACT

A vehicular shift apparatus includes an operation member configured to be put in five shift positions including a home position, a drive position, a reverse position, a drive-side neutral position, and a reverse-side neutral position. Nine sensing elements are provided to sense a magnet moved by movement of the operation member. The home position is allocated with three sensing elements, and each of the remaining four shift positions is allocated with two sensing elements, wherein two of the sensing elements allocate to the home position are shared by other two of the shift positions. The five shift positions and four intermediate positions between respective two adjacent shift positions are determined, based on combination of outputs of the nine sensing elements.

4 Claims, 20 Drawing Sheets

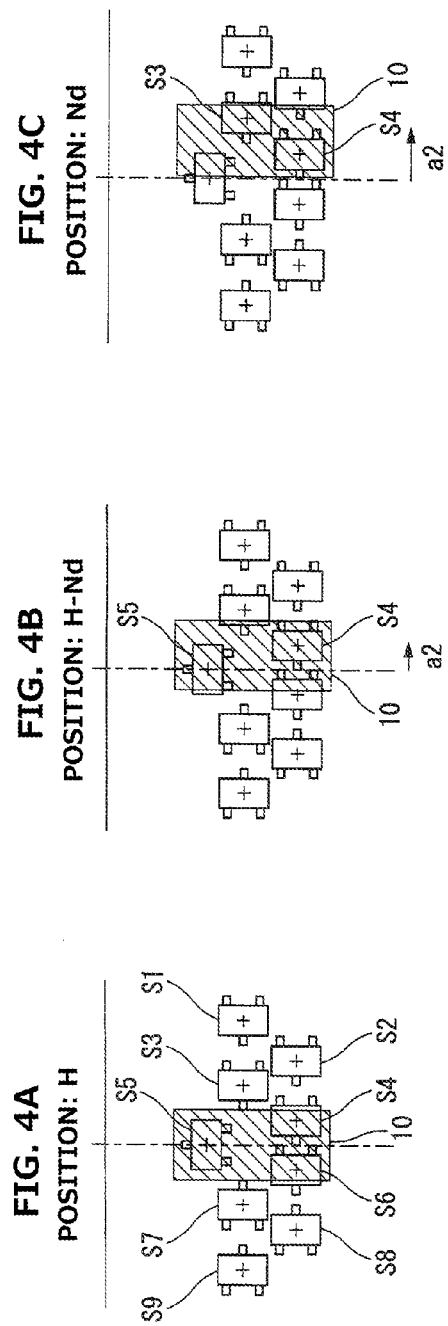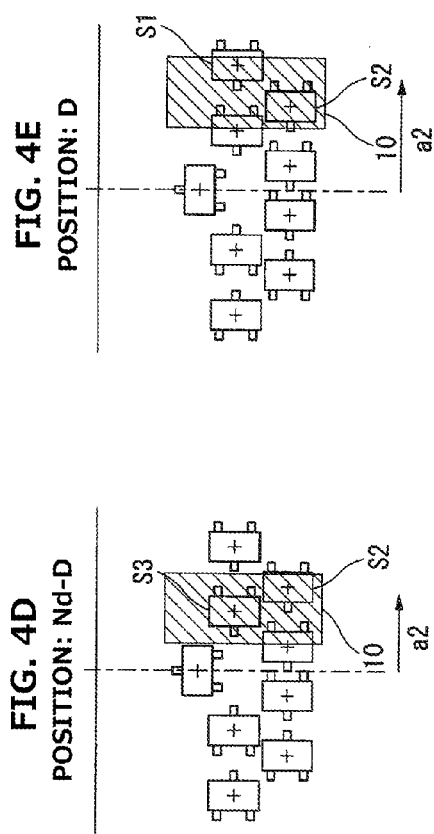

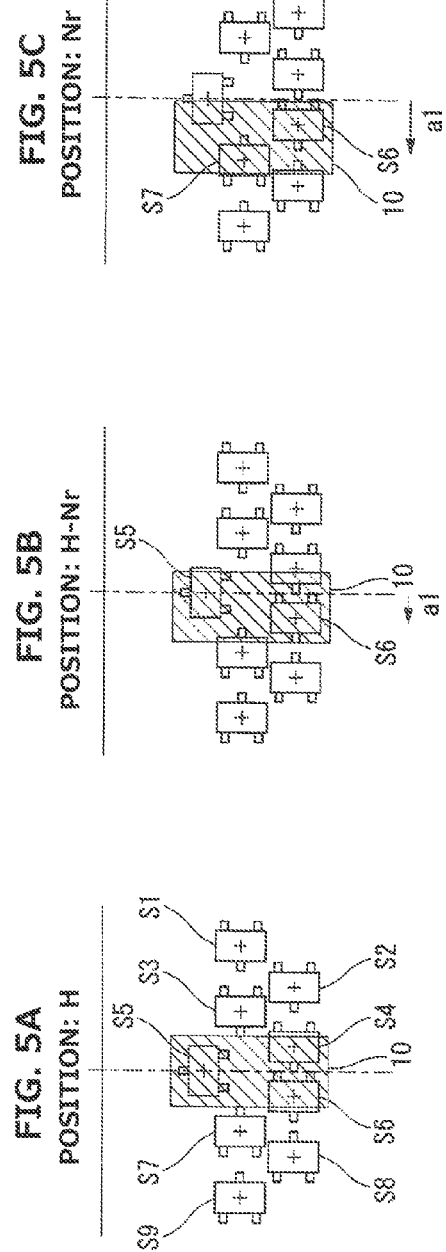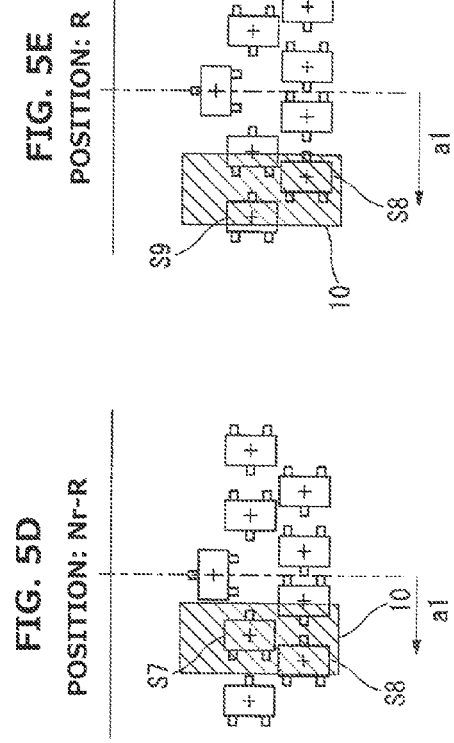

FIG. 6

| SENSOR OUTPUT (NORMAL) POSITIONS / SENSORS | D | Nd-D (INTERMEDIATE) | Nd | H-Nd (INTERMEDIATE) | H | H-Nr (INTERMEDIATE) | Nr | Nr-R (INTERMEDIATE) | R |
|---|---|---|---|---|---|---|---|---|---|
| S1 | H | L | L | L | L | L | L | L | L |
| S2 | H | H | L | L | L | L | L | L | L |
| S3 | L | H | H | L | L | L | L | L | L |
| S4 | L | L | H | H | H | L | L | L | L |
| S5 | L | L | L | H | H | H | L | L | L |
| S6 | L | L | L | L | H | H | H | L | L |
| S7 | L | L | L | L | L | L | H | H | L |
| S8 | L | L | L | L | L | L | L | H | H |
| S9 | L | L | L | L | L | L | L | L | H |

FIG. 7

SENSOR OUTPUT (NORMAL)

| SENSORS \ POSITIONS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 8A

SENSOR OUTPUT (SENSOR S1: ON-STATE FAILURE)

| SENSORS \ POSITIONS | D | Nd | H | Nr | R |
|---|---|---|---|---|---|
| S1 | H | H | H | H | H |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 8B

SENSOR OUTPUT (SENSOR S1: OFF-STATE FAILURE)

| SENSORS \ POSITIONS | D | Nd | H | Nr | R |
|---|---|---|---|---|---|
| S1 | L | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 9A

SENSOR OUTPUT (SENSOR S2: ON-STATE FAILURE)

| SENSORS \ POSITIONS | D | Nd | H | Nr | R |
|---|---|---|---|---|---|
| S 1 | H | L | L | L | L |
| S 2 | H | H | H | H | H |
| S 3 | L | H | L | L | L |
| S 4 | L | H | H | L | L |
| S 5 | L | L | H | L | L |
| S 6 | L | L | H | H | L |
| S 7 | L | L | L | H | L |
| S 8 | L | L | L | L | H |
| S 9 | L | L | L | L | H |

FIG. 9B

SENSOR OUTPUT (SENSOR S2: OFF-STATE FAILURE)

| SENSORS \ POSITIONS | D | Nd | H | Nr | R |
|---|---|---|---|---|---|
| S 1 | H | L | L | L | L |
| S 2 | L | L | L | L | L |
| S 3 | L | H | L | L | L |
| S 4 | L | H | H | L | L |
| S 5 | L | L | H | L | L |
| S 6 | L | L | H | H | L |
| S 7 | L | L | L | H | L |
| S 8 | L | L | L | L | H |
| S 9 | L | L | L | L | H |

FIG. 10A

SENSOR OUTPUT (SENSOR S3: ON-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | H | H | H | H | H |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 10B

SENSOR OUTPUT (SENSOR S3: OFF-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | L | L | L | L | L |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 11A

SENSOR OUTPUT (SENSOR S4: ON-STATE FAILURE)

| POSITIONS<br>SENSORS | D | Nd | H | Nr | R |
|---|---|---|---|---|---|
| S1 | H | L | L | L | L |
| S2 | H | L | L | L | L |
| S3 | L | H | L | L | L |
| S4 | H | H | H | H | H |
| S5 | L | L | H | L | L |
| S6 | L | L | H | H | L |
| S7 | L | L | L | H | L |
| S8 | L | L | L | L | H |
| S9 | L | L | L | L | H |

FIG. 11B

SENSOR OUTPUT (SENSOR S4: OFF-STATE FAILURE)

| POSITIONS<br>SENSORS | D | Nd | H | Nr | R |
|---|---|---|---|---|---|
| S1 | H | L | L | L | L |
| S2 | H | L | L | L | L |
| S3 | L | H | L | L | L |
| S4 | L | L | L | L | L |
| S5 | L | L | H | L | L |
| S6 | L | L | H | H | L |
| S7 | L | L | L | H | L |
| S8 | L | L | L | L | H |
| S9 | L | L | L | L | H |

FIG. 12A

SENSOR OUTPUT (SENSOR S5: ON-STATE FAILURE)

| SENSORS \ POSITIONS | D | Nd | H | Nr | R |
|---|---|---|---|---|---|
| S 1 | H | L | L | L | L |
| S 2 | H | L | L | L | L |
| S 3 | L | H | L | L | L |
| S 4 | L | H | H | L | L |
| S 5 | H | H | H | H | H |
| S 6 | L | L | H | H | L |
| S 7 | L | L | L | H | L |
| S 8 | L | L | L | L | H |
| S 9 | L | L | L | L | H |

FIG. 12B

SENSOR OUTPUT (SENSOR S5: OFF-STATE FAILURE)

| SENSORS \ POSITIONS | D | Nd | H | Nr | R |
|---|---|---|---|---|---|
| S 1 | H | L | L | L | L |
| S 2 | H | L | L | L | L |
| S 3 | L | H | L | L | L |
| S 4 | L | H | H | L | L |
| S 5 | L | L | L | L | L |
| S 6 | L | L | H | H | L |
| S 7 | L | L | L | H | L |
| S 8 | L | L | L | L | H |
| S 9 | L | L | L | L | H |

FIG. 13A

SENSOR OUTPUT (SENSOR S6: ON-STATE FAILURE)

| SENSORS \ POSITIONS | D | Nd | H | Nr | R |
|---|---|---|---|---|---|
| S 1 | H | L | L | L | L |
| S 2 | H | L | L | L | L |
| S 3 | L | H | L | L | L |
| S 4 | L | H | H | L | L |
| S 5 | L | L | H | L | L |
| S 6 | H | H | H | H | H |
| S 7 | L | L | L | H | L |
| S 8 | L | L | L | L | H |
| S 9 | L | L | L | L | H |

FIG. 13B

SENSOR OUTPUT (SENSOR S6: OFF-STATE FAILURE)

| SENSORS \ POSITIONS | D | Nd | H | Nr | R |
|---|---|---|---|---|---|
| S 1 | H | L | L | L | L |
| S 2 | H | L | L | L | L |
| S 3 | L | H | L | L | L |
| S 4 | L | H | H | L | L |
| S 5 | L | L | H | L | L |
| S 6 | L | L | L | L | L |
| S 7 | L | L | L | H | L |
| S 8 | L | L | L | L | H |
| S 9 | L | L | L | L | H |

FIG. 14A

SENSOR OUTPUT (SENSOR S7: ON-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | H | H | H | H | H |
| S8 | L | L | L | L | H |
| S9 | L | L | L | L | H |

FIG. 14B

SENSOR OUTPUT (SENSOR S7: OFF-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | L | L |
| S8 | L | L | L | L | H |
| S9 | L | L | L | L | H |

FIG. 15A

SENSOR OUTPUT (SENSOR S8: ON-STATE FAILURE)

| POSITIONS<br>SENSORS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | H |
| ~~S8~~ | H | H | H | H | H |
| S9 | L | L | L | L | H |

FIG. 15B

SENSOR OUTPUT (SENSOR S8: OFF-STATE FAILURE)

| POSITIONS<br>SENSORS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | L |
| ~~S8~~ | L | L | L | L | L |
| S9 | L | L | L | L | H |

FIG. 16A

SENSOR OUTPUT (SENSOR S9: ON-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | H |
| S8 | L | L | L | L | H |
| S9 | H | H | H | H | H |

FIG. 16B

SENSOR OUTPUT (SENSOR S9: OFF-STATE FAILURE)

| SENSORS \ POSITIONS | D | Nd | H | Nr | R |
|---|---|---|---|---|---|
| S1 | H | L | L | L | L |
| S2 | H | L | L | L | L |
| S3 | L | H | L | L | L |
| S4 | L | H | H | L | L |
| S5 | L | L | H | L | L |
| S6 | L | L | H | H | L |
| S7 | L | L | L | H | L |
| S8 | L | L | L | L | H |
| S9 | L | L | L | L | L |

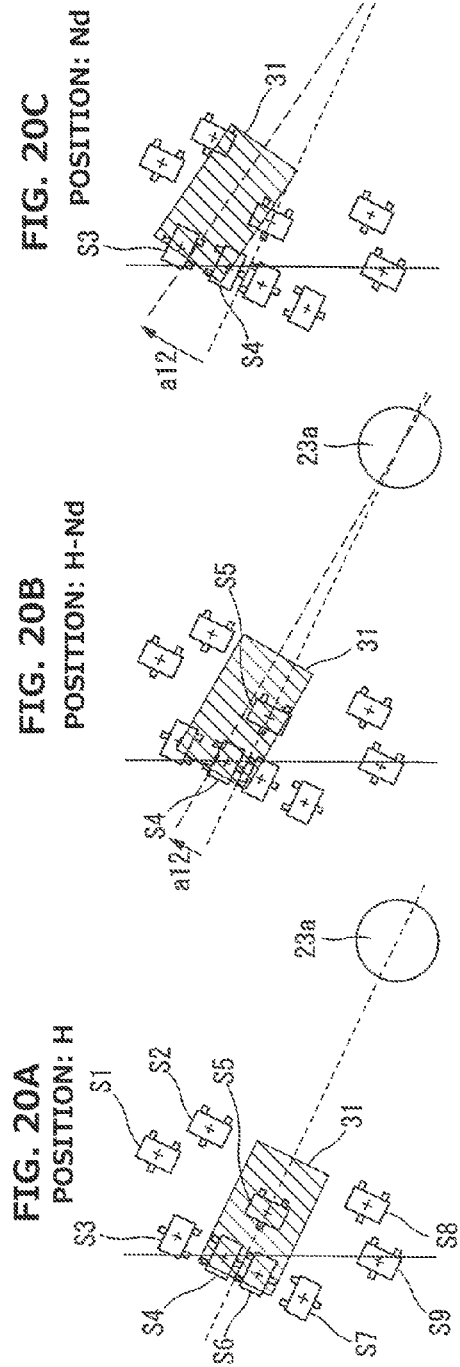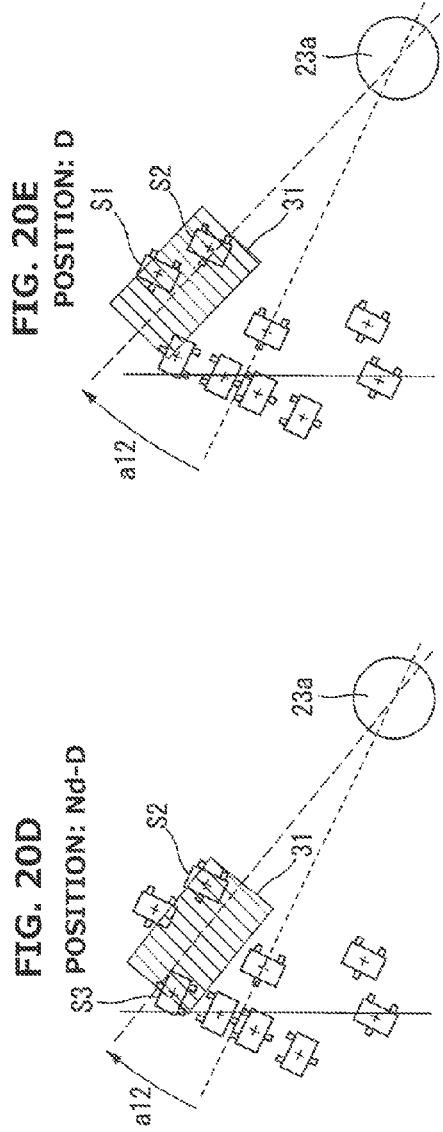

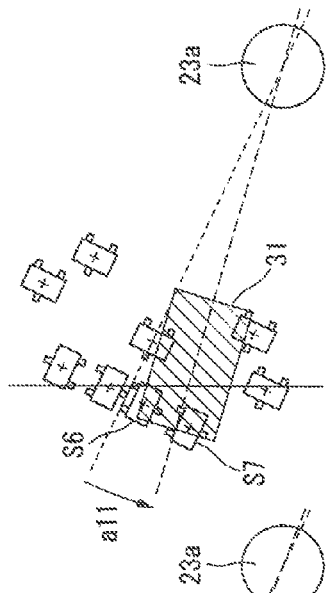
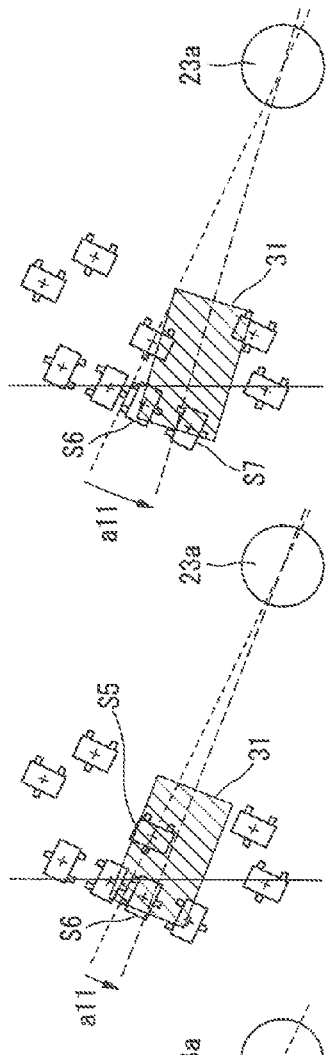
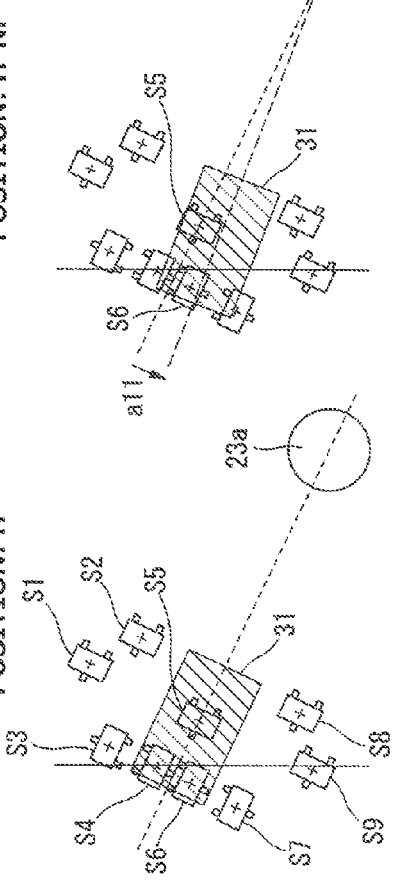
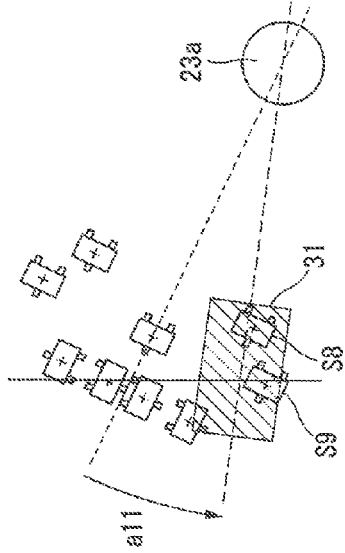
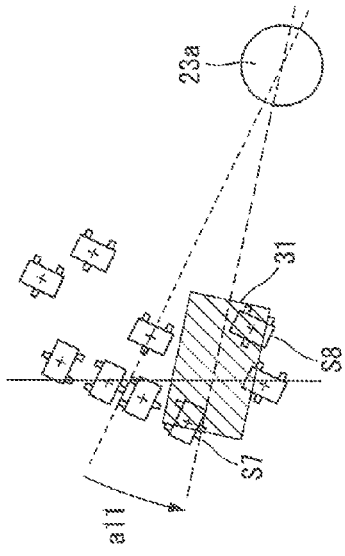
FIG. 21A POSITION: H
FIG. 21B POSITION: H~Nr
FIG. 21C POSITION: Nr
FIG. 21D POSITION: Nr~R
FIG. 21E POSITION: R

VEHICULAR SHIFT APPARATUS

BACKGROUND OF THE INVENTION

The present invention relates generally to a vehicular shift apparatus for an automatic transmission mounted on an automotive vehicle, and particularly to a vehicular shift apparatus of shift-by-wire type.

Japanese Patent Application Publication No. 2014-031149 (JP 2014-031149 A) discloses a vehicular shift apparatus of shift-by-wire type, in which a rotary knob as an operation member is configured to be rotated in a first direction from a home position to a drive position, and rotated in a second direction from the home position to a reverse position. The rotary knob is further provided with a neutral position between the home position and the drive range position, and a neutral position between the home position and the reverse range position. Operation of the rotary knob is sensed by combination of a magnet and a sensing element. The rotary knob is provided with the magnet which is configured to be rotated by rotation of the rotary knob. On the other hand, the sensing element is placed on a board to face the magnet, and is configured to sense changes of magnetic flux of the magnet, and thereby identify which shift position the rotary knob is in.

Japanese Patent Application Publication No. 2014-020922 (JP 2014-020922 A), corresponding to US 2014/0020495 A1, discloses a vehicular shift apparatus which includes a shift lever as an operation member provided with a magnet, and a plurality of sensing elements facing the magnet, wherein the sensing elements are arranged in a line along a trajectory of the magnet, as shown in FIGS. 14 to 19. When the shift lever is moved from one shift position to an adjacent shift position, the magnet moves by a distance corresponding two sensing elements, and one sensing element remains in on-state, and another sensing element shifts from on-state into off-state, and another sensing element shifts from off-state into on-state. Based on combination of outputs of the sensing elements, operation of the shift lever is determined.

SUMMARY OF THE INVENTION

In the vehicular shift apparatus of JP 2014-031149 A, the sensing element is implemented by a single magnetic sensor. Accordingly, if the angle of rotation of the operation member in the form of rotary knob is small, it adversely affects the accuracy of sensing of the shift positions. If not only the shift positions but also intermediate positions between adjacent two of the shift positions are to be sensed, the movement of the magnet may need to be expanded from the angle of rotation of the operation member by a link mechanism or gear mechanism or the like. Such multiple position sensing is in general difficult by this vehicular shift apparatus.

The vehicular shift apparatus of JP 2014-020922 A requires eight sensing elements and three blanks arranged in eleven locations in a line as shown in FIGS. 14 to 19 of JP 2014-020922 A. This configuration requires a significant large movement of the magnet, and thereby may need the movement of the magnet to be expanded from the angle of rotation of the operation member by a link mechanism or gear mechanism or the like, as in the vehicular shift apparatus of JP 2014-031149 A. Especially, if a knob or dial type operation member is employed, this issue about multiple position sensing is more significant.

Moreover, in the vehicular shift apparatus of JP 2014-020922 A, a common sensing element is allocated to a first shift position and a second shift position adjacent to each other. This configuration faces a problem that if a sensing element is failed, it is possible that the current shift position of the operation member cannot be identified based only on the current sensing result. The identification may need to be implemented by referring further to the previous sensing result. This leads to complexity of a control system.

In view of the foregoing, it is preferable to provide a vehicular shift apparatus capable of sensing not only shift positions of an operation member but also intermediate positions between adjacent two of the shift positions, and identifying which one of the shift positions the operation member is in, only based on the current sensing result, even if one of the sensing elements is failed.

According to one aspect of the present invention, a vehicular shift apparatus comprises: an operation member configured to be rotated by shifting operation, and put in a selected one of five set shift positions, wherein the five set shift positions include a home position, a drive position for forward drive, a reverse position for reverse drive, a drive-side neutral position, and a reverse-side neutral position, wherein the home position is between the drive position and the reverse position, wherein the drive-side neutral position is between the home position and the drive position, wherein the reverse-side neutral position is between the home position and the reverse position, and wherein the operation member is further configured to return to the home position by release of shifting operation; a magnet configured to be rotated along a trajectory by rotation of the operation member; and first, second, third, fourth, fifth, sixth, seventh, eighth, and ninth sensing elements placed on a board and arranged along the trajectory of the magnet, wherein the board faces the magnet, wherein each of the first to ninth sensing elements is configured to contactlessly sense the magnet by being in a first state in response to being close to the magnet, and wherein the first state indicates presence of the magnet; wherein: each of the first and second sensing elements is further configured to be in the first state in response to a condition where the operation member is in the drive position; each of the third and fourth sensing elements is further configured to be in the first state in response to a condition where the operation member is in the drive-side neutral position; each of the fourth, fifth, and sixth sensing elements is further configured to be in the first state in response to a condition where the operation member is in the home position; each of the sixth and seventh sensing elements is further configured to be in the first state in response to a condition where the operation member is in the reverse-side neutral position; each of the eighth and ninth sensing elements is further configured to be in the first state in response to a condition where the operation member is in the reverse position; each of the fourth and fifth sensing elements is further configured to be in the first state in response to a condition where the operation member is in a first drive-side intermediate position between the home position and the drive-side neutral position; each of the second and third sensing elements is further configured to be in the first state in response to a condition where the operation member is in a second drive-side intermediate position between the drive-side neutral position and the drive position; each of the fifth and sixth sensing elements is further configured to be in the first state in response to a condition where the operation member is in a first reverse-side intermediate position between the home position and the reverse-side neutral position; and each of the seventh and eighth sensing elements is further configured to be in the first state in response to a condition where the operation member is in a second reverse-side intermediate position between the reverse-side neutral position and the reverse position.

The vehicular shift apparatus may further comprises a controller, wherein: the controller is configured to receive input of sensing outputs from the first to ninth sensing elements, and determine, depending on combination of the sensing outputs, where the operation member is positioned, and output a result of the determination; and the controller is further configured to determine that the operation member is in the home position, in response to a condition where each of the fourth and fifth sensing elements is in the first state, before the sixth sensing element is put into the first state, when the operation member is returning toward the home position from one of the drive position and the drive-side neutral position, and in response to a condition where each of the fifth and sixth sensing elements is in the first state, before the fourth sensing element is put into the first state, when the operation member is returning toward the home position from one of the reverse position and the reverse-side neutral position. The vehicular shift apparatus may be further configured such that the controller is further configured to: determine that the operation member is in the drive position, in response to a condition where at least one of the first and second sensing elements is in the first state; determine that the operation member is in the reverse position, in response to a condition where at least one of the eighth and ninth sensing elements is in the first state; determine that the operation member is in the drive-side neutral position, in response to a condition where at least one of the third and fourth sensing elements is in the first state; determine that the operation member is in the reverse-side neutral position, in response to a condition where at least one of the sixth and seventh sensing elements is in the first state; and determine that the operation member is in the home position, in response to a condition where each of at least two of the fourth, fifth, and sixth sensing elements is in the first state. The vehicular shift apparatus may be further configured such that: the fifth sensing element is disposed between the fourth sensing element and the sixth sensing element along the trajectory of the magnet; the fourth sensing element and the sixth sensing element face each other along the trajectory of the magnet; and an interval between the fourth sensing element and the sixth sensing element is smaller than that between the first sensing element and the second sensing element, that between the third sensing element and the fourth sensing element, that between the sixth sensing element and the seventh sensing element, and that between the eighth sensing element and the ninth sensing element, along the trajectory of the magnet.

BRIEF DESCRIPTION OF THE DRAWINGS

FIGS. 4A to 4E are schematic diagrams showing positional relationship among a plurality of magnetic sensors on a board and a magnet for five positions of an operation member in the vehicular shift apparatus of FIG. 1.

FIGS. 5A to 5E are schematic diagrams showing positional relationship among the magnetic sensors and the magnet for five positions of the operation member.

FIG. 6 is a table showing combination of outputs of the magnetic sensors for nine positions of the operation member.

FIG. 7 is a table showing combination of outputs of the magnetic sensors for five shift positions of the operation member, where columns for four intermediate positions of the operation member are removed from FIG. 6.

FIG. 8A is a table showing combination of outputs of the magnetic sensors for the five shift positions under a condition where a first magnetic sensor is in a state of on-state failure. FIG. 8B is a table showing combination of outputs of the magnetic sensors for the five shift positions under a condition where the first magnetic sensor is in a state of off-state failure.

FIG. 9A is a table showing combination of outputs of the magnetic sensors for the five shift positions under a condition where a second magnetic sensor is in a state of on-state failure. FIG. 9B is a table showing combination of outputs of the magnetic sensors for the five shift positions under a condition where the second magnetic sensor is in a state of off-state failure.

FIG. 10A is a table showing combination of outputs of the magnetic sensors for the five shift positions under a condition where a third magnetic sensor is in a state of on-state failure. FIG. 10B is a table showing combination of outputs of the magnetic sensors for the five shift positions under a condition where the third magnetic sensor is in a state of off-state failure.

FIG. 11A is a table showing combination of outputs of the magnetic sensors for the five shift positions under a condition where a fourth magnetic sensor is in a state of on-state failure. FIG. 11B is a table showing combination of outputs of the magnetic sensors for the five shift positions under a condition where the fourth magnetic sensor is in a state of off-state failure.

FIG. 12A is a table showing combination of outputs of the magnetic sensors for the five shift positions under a condition where a fifth magnetic sensor is in a state of on-state failure. FIG. 12B is a table showing combination of outputs of the magnetic sensors for the five shift positions under a condition where the fifth magnetic sensor is in a state of off-state failure.

FIG. 13A is a table showing combination of outputs of the magnetic sensors for the five shift positions under a condition where a sixth magnetic sensor is in a state of on-state failure. FIG. 13B is a table showing combination of outputs of the magnetic sensors for the five shift positions under a condition where the sixth magnetic sensor is in a state of off-state failure.

FIG. 14A is a table showing combination of outputs of the magnetic sensors for the five shift positions under a condition where a seventh magnetic sensor is in a state of on-state failure. FIG. 14B is a table showing combination of outputs of the magnetic sensors for the five shift positions under a condition where the seventh magnetic sensor is in a state of off-state failure.

FIG. 15A is a table showing combination of outputs of the magnetic sensors for the five shift positions under a condition where an eighth magnetic sensor is in a state of on-state failure. FIG. 15B is a table showing combination of outputs of the magnetic sensors for the five shift positions under a condition where the eighth magnetic sensor is in a state of off-state failure.

FIG. 16A is a table showing combination of outputs of the magnetic sensors for the five shift positions under a condition where a ninth magnetic sensor is in a state of on-state failure. FIG. 16B is a table showing combination of outputs of the magnetic sensors for the five shift positions under a condition where the ninth magnetic sensor is in a state of off-state failure.

FIGS. 20A to 20E are schematic diagrams showing positional relationship among a plurality of magnetic sensors on a board and a magnet for five positions of an operation member in the vehicular shift apparatus of FIG. 18A.

FIGS. 21A to 21E are schematic diagrams showing positional relationship among the magnetic sensors and the magnet for five positions of the operation member in the vehicular shift apparatus of FIG. 18A.

DETAILED DESCRIPTION OF THE INVENTION

Figure 1:
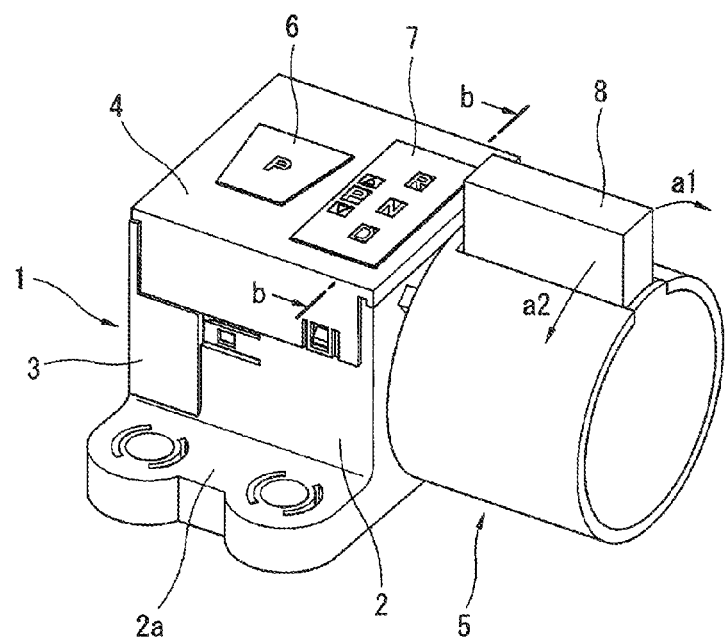
FIG. 1 is a perspective view of a vehicular shift apparatus of knob type according to a first embodiment of the present invention.
Figure 2:
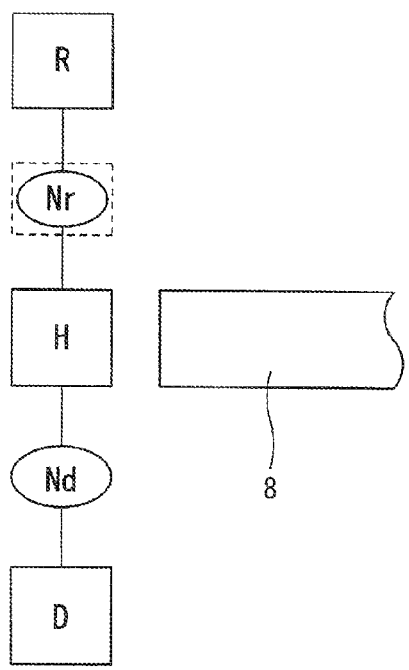
FIG. 2 is a schematic diagram showing a shift position pattern of the vehicular shift apparatus of FIG. 1.

FIGS. 1 to 17 show a vehicular shift apparatus of knob type according to a first embodiment of the present invention. FIG. 1 shows the whole of the vehicular shift apparatus in a perspective view. FIG. 2 shows a shift position (or range position) pattern of the vehicular shift apparatus of FIG. 1.

As shown in FIG. 1, the vehicular shift apparatus includes a case 1 and an operation knob 5 of dial type as an operation member. The case 1 has a generally rectangular parallelepiped shape having a bottom side including a mounting seat portion 2a to be attached to another member. The operation knob 5 is mounted to one of four side outer surfaces of the case 1 with its rotational axis extending horizontally and perpendicular to the side outer surface. The case 1 includes a case body 2 including the mounting seat portion 2a, a side case 3, and an upper cover 4. The vehicular shift apparatus is mounted to a part of a steering column supporting a steering wheel, or mounted to a part of an instrumental panel close to the steering wheel.

The vehicular shift apparatus includes a parking switch 6 and a shift position indicator 7 on an upper surface of the upper cover 4 of the case 1. The parking switch 6 is of lighted button type, also serving as a parking indicator. The shift position indicator 7 is of lighted type. The operation knob 5 has a cylindrical shape, and is rotatably supported by the case 1 to rotate in a normal direction (in the direction of an arrow a1 in FIG. 1) and in a reverse direction (in the direction of an arrow a2 in FIG. 1) along a circumferential direction of the operation knob 5. The operation knob 5 is configured to be rotated in the normal direction and in the reverse direction to perform selecting and shifting among the shift positions. The normal direction of the operation knob 5 (the direction of the arrow a1) is set to be forward in a vehicle longitudinal direction when the vehicular shift apparatus is mounted to the vehicle.

The operation knob 5 is provided with a knob button 8. The knob button 8 is disposed at a top position of the outer peripheral surface of the operation knob 5, and configured to travel outward and inward in the radial direction of the operation knob 5. The knob button 8 has a flat box shape extending entirely in the longitudinal direction (i.e. axial direction) of the operation knob 5. The shift position indicator 7, which is adjacent to the operation knob 5, includes an indication "N" indicating a neutral mode (or neutral position), an indication "D" indicating a forward drive mode (or drive position), and an indication "R" indicating a reverse drive mode (or reverse position). The operation knob 5 is normally self-retained in a position corresponding to the position of the indication "N" of the shift position indicator 7.

FIG. 2 shows a shift position pattern in which the operation knob 5 is rotated, where the shift position patter is developed into a plane. The operation knob 5 is provided with five set shift positions, which are defined separately from the three indications N, D, R of the shift position indicator 7. As shown in FIG. 2, the shift positions of the operation knob 5 include a home position H, a drive position D, a reverse position R, a drive-side neutral position Nd, and a reverse-side neutral position Nr. The home position H is a neutral position of the operation knob 5 in the rotational direction. The drive position D is a position for forward drive which is selected by rotating the operation knob 5 from the home position H in the reverse direction (in the direction of the arrow a2). The reverse position R is a position for reverse drive which is selected by rotating the operation knob 5 from the home position H in the normal direction (in the direction of the arrow a?). The drive-side neutral position Nd is a first neutral position between the home position H and the drive position D. The reverse-side neutral position Nr is a second neutral position between the home position H and the reverse position R.

The home position H of the operation knob 5 corresponds in position to the indication N of the shift position indicator 7. The drive position D of the operation knob 5 corresponds in position to the indication D of the shift position indicator 7. The reverse position R of the operation knob 5 corresponds in position to the indication R of the shift position indicator 7.

In general, the angle of rotation of the operation knob 5 from the home position H to the drive position D and the angle of rotation of the operation knob 5 from the home position H to the reverse position R are equal to about 10 degrees or smaller. The operation knob 5 is configured to return immediately by itself to the home position H from any position other than the home position H, when a force of shifting operation (or rotational operating force) is released from the operation knob 5. In other words, the operation knob 5 is not configured to remain by itself in each of the drive position D, the reverse position R, the drive-side neutral position Nd, and the reverse-side neutral position Nr. In this way, the vehicular shift apparatus is of momentary type.

The operation knob 5 is provided with a lock mechanism not shown therein. When the operation knob 5 is moved from the home position H toward the reverse position R, the operation knob 5 is stopped and locked in the reverse-side neutral position Nr. Then, the operation knob 5 is unlocked and allowed to be moved to the reverse position R by pressing the knob button 8 into the inside of the operation knob 5 in the radial direction.

Figure 3:
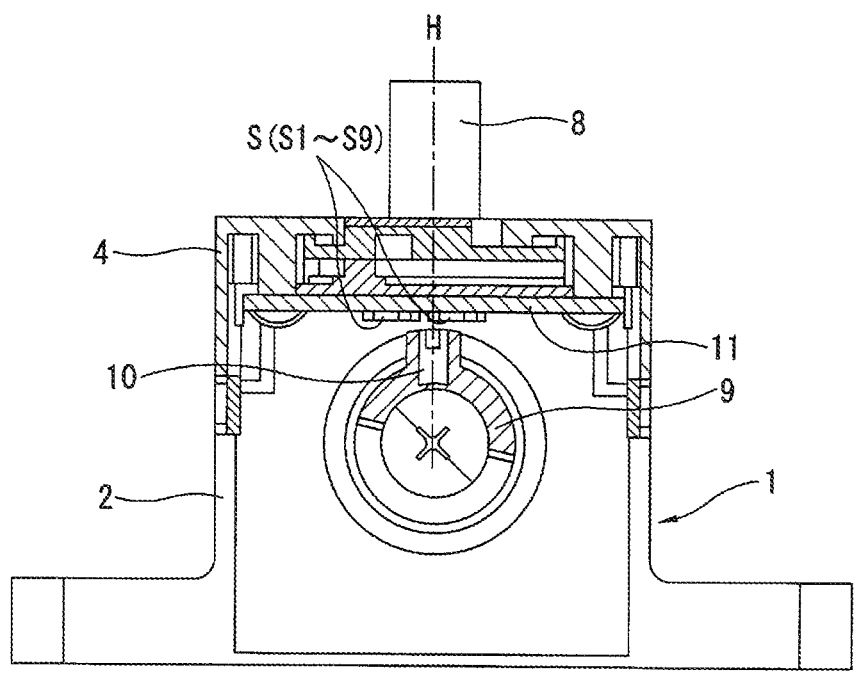
FIG. 3 is a cross-sectional view of the vehicular shift apparatus of FIG. 1 taken along a plane indicated by a line b-b in FIG. 1.

FIG. 3 shows a cross-sectional view of the vehicular shift apparatus of FIG. 1 taken along a plane indicated by a line b-b in FIG. 1. The case body 2 houses a rotor 9 configured to be rotated by rotation of the operation knob 5, so that the rotor 9 rotates or swings integrally and coaxially with the operation knob 5. The rotor 9 is provided with a magnet 10 embedded in an upper part of the rotor 9. The magnet 10 is a permanent magnet having a narrow bar shape. The case body 2 also houses a board 11 placed on an inner lower surface of the upper cover 4 covering an upper opening of the case body 2. The board 11 is provided with a sensor set S including nine magnetic sensors S1, S2, S3, S4, S5, S6, S7, S8 and S9 placed on an inside surface of the board 11 facing the magnet 10 of the rotor 9. The magnetic sensors S1-S9 are arranged along a trajectory of rotation or swing of the magnet 10, covering an area where the magnet 10 passes. Each magnetic sensor S1-S9 is a contactless-type sensing element such as a Hall-effect element. The magnetic sensors S1-S9 are arranged as shown in FIG. 4A. Each magnetic sensor S1-S9 is configured to be switched between on-state and off-state by relative movement (approaching or deviating) of the magnet 10 caused by shifting operation of the operation knob 5, and thereby output binary signals including an on-state signal and an off-state signal. When the operation knob 5 is put in a selected one of the shift positions, the selected shift position is identified based on combination of the signal outputs from the magnetic sensors S1-S9.

As detailed below, the magnetic sensors S1-S9 are arranged to determine not only the five set shift positions of the operation knob 5 but also four intermediate positions of the operation knob 5 between adjacent two of the set shift positions.

FIGS. 4A to 5E show arrangement of the magnetic sensors S1-S9, and show positions of the magnet 10 with respect to the magnetic sensors S1-S9 for several conditions made by shifting operation of the operation knob 5. The magnet 10 is embedded in the rotor 9, and rotated integrally by shifting operation of the operation knob 5 to rotate in the direction of rotation of the operation knob 5, and move in the direction of an arrow a2 in FIGS. 4A to 4E when the operation knob 5 is rotated in the direction of the arrow a2 in FIG. 1, and in the direction of an arrow a1 in FIGS. 5A to 5E when the operation knob 5 is rotated in the direction of the arrow a1 in FIG. 1.

Specifically, FIG. 4A shows where the magnet 10 is positioned with respect to the magnetic sensors S1-S9 under a condition where the operation knob 5 is in the home position H. FIG. 4E shows where the magnet 10 is positioned with respect to the magnetic sensors S1-S9 under a condition where the operation knob 5 is in the drive position D. FIG. 4C shows where the magnet 10 is positioned with respect to the magnetic sensors S1-S9 under a condition where the operation knob 5 is in the drive-side neutral position (first neutral position) Nd between the home position H and the drive position D. FIG. 4B shows where the magnet 10 is positioned with respect to the magnetic sensors S1-S9 under a condition where the operation knob 5 is in a first drive-side intermediate position H-Nd between the home position H and the drive-side neutral position Nd. FIG. 4D shows where the magnet 10 is positioned with respect to the magnetic sensors S1-S9 under a condition where the operation knob 5 is in a second drive-side intermediate position Nd-D between the drive position D and the drive-side neutral position Nd.

Similarly, FIG. 5A shows where the magnet 10 is positioned with respect to the magnetic sensors S1-S9 under a condition where the operation knob 5 is in the home position H. FIG. 5E shows where the magnet 10 is positioned with respect to the magnetic sensors S1-S9 under a condition where the operation knob 5 is in the reverse position R. FIG. 5C shows where the magnet 10 is positioned with respect to the magnetic sensors S1-S9 under a condition where the operation knob 5 is in the reverse-side neutral position (second neutral position) Nr between the home position H and the reverse position R. FIG. 5B shows where the magnet 10 is positioned with respect to the magnetic sensors S1-S9 under a condition where the operation knob 5 is in a first reverse-side intermediate position H-Nr between the home position H and the reverse-side neutral position Nr. FIG. 5D shows where the magnet 10 is positioned with respect to the magnetic sensors S1-S9 under a condition where the operation knob 5 is in a second reverse-side intermediate position Nr-R between the reverse position R and the reverse-side neutral position Nr.

In FIGS. 4A to 5E, the area of the board 11 influenced substantially by the magnetic flux of the magnet 10 is indicated by hatching pattern. In general, this area encompasses the actual shape of the magnet 10 and is larger than the actual shape of the magnet 10, depending on a process of magnetizing. Conversely, the shape and size of the magnet 10 is set to create the area of magnetic flux shown in FIGS. 4A to 5E. It is assumed that even when the magnetic sensor S1-S9 is close to the magnet 10, the magnetic sensor S1-S9 remains in off-state, unless the center of the magnetic sensor S1-S9 indicated by "+" in FIGS. 4A to 5E is out of the area of magnetic flux of the magnet 10. When the center of the magnetic sensor S1-S9 enters the area of magnetic flux of the magnet 10, the magnetic sensor S1-S9 then shifts into on-state.

As shown in FIGS. 4A to 5E, the magnetic sensors S1-S9 are arranged on the board 11 in two lines along the direction of rotation or swinging motion of the magnet 10 caused by shifting operation of the operation knob 5. In this embodiment, the magnetic sensors S2, S4, S6 and S8 are arranged in the lower line, whereas the magnetic sensors S1, S3, S5, S7 and S9 are arranged in the upper line, wherein the fifth magnetic sensor S5 is slightly deviated upwardly from the upper line, and the posture of the fifth magnetic sensor S5 is perpendicular to the other magnetic sensors. The location of each magnetic sensor S1-S9 is within the area where the magnet 10 passes. The interval between the fourth magnetic sensor S4 and the sixth magnetic sensor S6 is smaller than that between the first magnetic sensor S1 and the second magnetic sensor S2, that between the third magnetic sensor S3 and the fourth magnetic sensor S4, that between the sixth magnetic sensor S6 and the seventh magnetic sensor S7, and that between the eighth magnetic sensor S8 and the ninth magnetic sensor S9, in the direction of movement of the magnet 10.

The magnetic sensors S4 and S6 in the lower line and the fifth magnetic sensor S5 in the upper line are allocated to the home position H, wherein combination of the on-states of these magnetic sensors indicates that the operation knob 5 is in the home position H. The fourth magnetic sensor S4 in the lower line and the fifth magnetic sensor S5 in the upper line are allocated to the first drive-side intermediate position H-Nd. The third magnetic sensor S3 in the upper line and the fourth magnetic sensor S4 in the lower line are allocated to the drive-side neutral position Nd. With this allocation, shifting operation of the operation knob 5 from the home position H to the drive-side neutral position Nd is sensed by combination of the on-states of the magnetic sensors S3 and S4. Moreover, in a transient condition before the operation knob 5 reaches the drive-side neutral position Nd, it is sensed by combination of the on-states of the magnetic sensors S4 and S5 that the operation knob 5 is in the first drive-side intermediate position H-Nd.

Moreover, the second magnetic sensor S2 in the lower line and the third magnetic sensor S3 in the upper line are allocated to the second drive-side intermediate position Nd-D. The first magnetic sensor S1 in the upper line and the second magnetic sensor S2 in the lower line are allocated to the drive position D. With this allocation, shifting operation of the operation knob 5 from the home position H to the drive position D via the drive-side neutral position Nd is sensed by combination of the on-states of the magnetic sensors S1 and S2. Moreover, in a transient condition before the operation knob 5 reaches the drive position D after passing through the drive-side neutral position Nd, it is sensed by combination of the on-states of the magnetic sensors S2 and S3 that the operation knob 5 is in the second drive-side intermediate position Nd-D.

The positional relationship shown in FIGS. 5A to 5E is similar to the positional relationship described above with reference to FIGS. 4A to 4E. Namely, the sixth magnetic sensor S6 in the lower line and the fifth magnetic sensor S5 in the upper line are allocated to the first reverse-side intermediate position H-Nr. The seventh magnetic sensor S7 in the upper line and the sixth magnetic sensor S6 in the lower line are allocated to the reverse-side neutral position Nr. With this allocation, shifting operation of the operation knob 5 from the home position H to the reverse-side neutral position Nr is sensed by combination of the on-states of the magnetic sensors S6 and S7. Moreover, in a transient condition before the operation knob 5 reaches the reverse-side neutral position Nr, it is sensed by combination of the on-states of the magnetic sensors S5 and S6 that the operation knob 5 is in the first reverse-side intermediate position H-Nr.

Moreover, the eighth magnetic sensor S8 in the lower line and the seventh magnetic sensor S7 in the upper line are allocated to the second reverse-side intermediate position Nr-R. The ninth magnetic sensor S9 in the upper line and the eighth magnetic sensor S8 in the lower line are allocated to the reverse position R. With this allocation, shifting operation of the operation knob 5 from the home position H to the reverse position R via the reverse-side neutral position Nr is sensed by combination of the on-states of the magnetic sensors S8 and S9. Moreover, in a transient condition before the operation knob 5 reaches the reverse position R after passing through the reverse-side neutral position Nr, it is sensed by combination of the on-states of the magnetic sensors S7 and S8 that the operation knob 5 is in the second reverse-side intermediate position Nr-R.

FIG. 6 shows combination of on-states or off-states of the magnetic sensors S1-S9 for the five set shift positions D, Nd, H, Nr and R, and the four intermediate positions Nd-D, H-Nd, H-Hr and Hr-R. In this table, "H" indicates a high level for on-state, and "L" indicates a low level for off-state.

As shown in FIG. 6, except for the magnetic sensors S1 and S9, each magnetic sensor S2-S8 is commonly allocated to adjacent two of the nine positions including the intermediate positions. The fifth magnetic sensor S5 is commonly allocated to adjacent three of the nine positions, namely, the home position H, the first drive-side intermediate position H-Nd, and the first reverse-side intermediate position H-Nr. With this allocation, the nine positions of the operation knob 5 can be sensed based on combination of outputs of the magnetic sensors S1-S9.

The home position H is allocated with the magnetic sensors S4, S5 and S6, the drive position D is allocated with the magnetic sensors S1 and S2, and the reverse position R is allocated with the magnetic sensors S8 and S9. Accordingly, the home position H, the drive position D, and the reverse position R are allocated with respective unique sets of the magnetic sensors S1-S9 so that none of the magnetic sensors S1-S9 is common among the home position H, the drive position D, and the reverse position R.

FIG. 7 shows combination of on-off output of the magnetic sensors S1-S9 for the five set shift positions D, Nd, H, Nr and R, excluding the intermediate positions Nd-D, H-Nd, H-Hr and Hr-R. It can be easily understood from FIG. 7 that none of the magnetic sensors S1-S9 is common among the home position H, the drive position D, and the reverse position R as described above.

On the other hand, FIGS. 8A to 16B show combination of on-off outputs of the magnetic sensors S1-S9 when one of the magnetic sensors S1-S9 is failed, FIG. 7 shows combination of on-off outputs of the magnetic sensors S1-S9 when none of the magnetic sensors S1-S9 is failed. The failure is an on-state failure with which the magnetic sensor is constantly put in on-state independently of the position of the magnet 10, or an off-state failure with which the magnetic sensor is put constantly in off-state independently of the position of the magnet 10.

Specifically, FIG. 8A shows combination of outputs of the magnetic sensors S1-S9 when the first magnetic sensor S1 is in a state of on-state failure, whereas FIG. 8B shows combination of outputs of the magnetic sensors S1-S9 when the first magnetic sensor S1 is in a state of off-state failure. FIGS. 9A to 16B are similar to FIG. 8A or FIG. 8B, showing combination of outputs of the magnetic sensors S1-S9 when one of the magnetic sensors S2-S9 is in a state of on-state failure or state of off-state failure.

As shown in FIG. 7, among the five set shift positions, the set shift positions D, Nd, Nr and R except for the home position H are allocated with two unique magnetic sensors so that no magnetic sensor is common among the shift positions D, Nd, Nr and R. The home position H is allocated uniquely with the fifth magnetic sensor S5 allocated to none of the shift positions D, Nd, Nr and R, and is allocated with the fourth magnetic sensor S4 allocated also to the drive-side neutral position Nd and the fifth magnetic sensor S5 allocated also to the reverse-side neutral position Nr.

With the arrangement of the magnetic sensors S1-S9 described above, wherever of the five set shift positions D, Nd, H, Nr and R the operation knob 5 is moved by shifting operation, the selected shift position can be correctly identified based on combination of outputs of the magnetic sensors S1-S9.

On the other hand, as detailed below, even if one of the magnetic sensors S1-S9 is in a state of on-state failure or off-state failure, wherever of the five set shift positions D, Nd, H, Nr and R the operation knob 5 is moved by shifting operation, the selected shift position can be correctly identified based on combination of outputs of the magnetic sensors S1-S9 with reference to FIG. 8A to FIG. 16B.

For example, referring to FIG. 8A showing the condition where the first magnetic sensor S1 is in a state of on-state failure, and referring to FIG. 8B showing the condition where the first magnetic sensor S1 is in a state of off-state failure, it is to be noted that even when the first magnetic sensor S1 is constantly in on-state ("H" in the table) or off-state ("L" in the table), the pattern of outputs of the magnetic sensors S1-S9 of any one of the five shift positions D, Nd, H, Nr and R is not identical to the pattern of any other shift position. This is true also for the conditions shown in FIGS. 9A to 16B.

Therefore, even when one of the magnetic sensors S1-S9 is failed, the five shift positions D, Nd, H, Nr, and R selected by shifting operation can be identified correctly based on combination of outputs of the magnetic sensors S1-S9, which allows continuous normal operation of the vehicular shift apparatus.

The arrangement of the magnetic sensors S4, S5 and S6 allocated to the home position H is made as follows. The fourth magnetic sensor S4 and the sixth magnetic sensor S6 are placed on opposite sides of the fifth magnetic sensor S5, facing each other directly as shown in FIG. 4A. The interval between the fourth magnetic sensor S4 and the sixth magnetic sensor S6 is set smaller than that between the first magnetic sensor S1 and the second magnetic sensor S2, that between the third magnetic sensor S3 and the fourth magnetic sensor S4, that between the sixth magnetic sensor S6 and the seventh magnetic sensor S7, and that between the eighth magnetic sensor S8 and the ninth magnetic sensor S9, This configuration serves to reduce the range of travel of the magnet 10 rotated by rotation of the operation knob 5, so that the present invention is easily applicable to a vehicular shift apparatus where the amount of operation of the operation knob 5 is small. This further allows the board 11, where the magnetic sensors S1-S9 are placed, to be made compact, and thereby allows the whole vehicular shift apparatus to be made compact.

Figure 17:
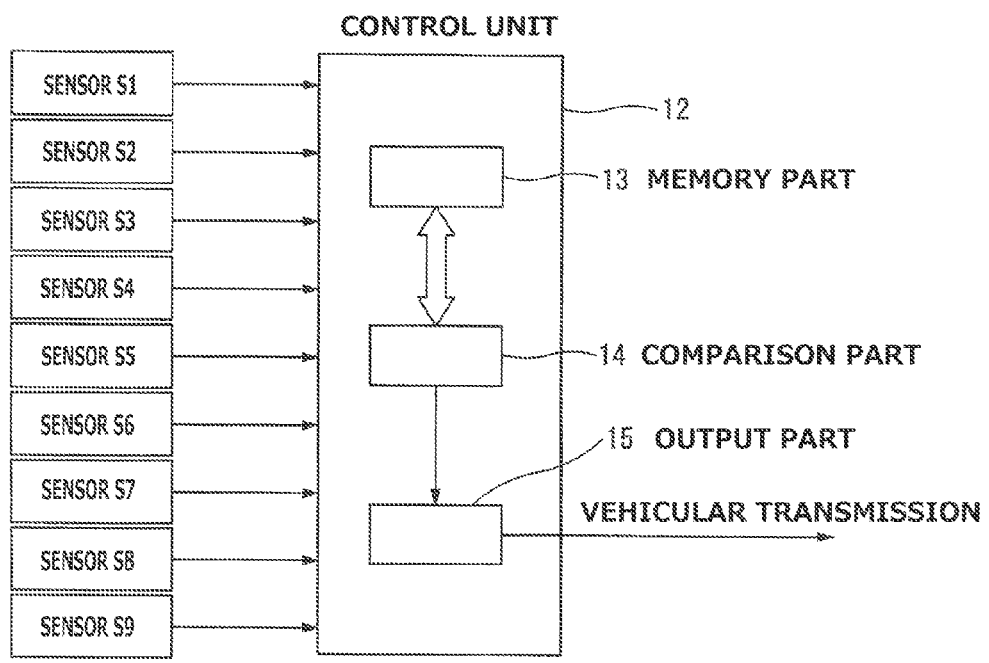
FIG. 17 is a system block diagram showing a control system of the vehicular shift apparatus of FIG. 1.

FIG. 17 shows a block diagram showing a control system of the vehicular shift apparatus. The control system includes the magnetic sensors S1-S9 and a control unit (shift-by-wire control unit) 12 as a controller. The control unit 12 is configured to receive input of sensing outputs of the magnetic sensors S1-S9. The control unit 12 is composed of components such as a CPU, a ROM, and a RAM, and includes a memory part 13, a comparison part 14, and an output part 15. The output part 15 is configured to finally output a shift command signal to a vehicular transmission based on the identified position of the operation knob 5.

The memory part 13 of the control unit 12 memorizes proactively the pattern of outputs of the magnetic sensors S1-S9 for the five set shift positions D, Nd, H, Nr and R and the four intermediate positions Nd-D, H-Nd, Nr-H and R-Nr shown in FIG. 6, and also the patterns of outputs of the magnetic sensors S1-S9 for the five set shift positions D, Nd, H, Nr and R when one of the magnetic sensors S1-S9 is in a state of on-state failure or off-state failure shown in FIGS. 8A to 16B.

The comparison part 14 of the control unit 12 is configured to compare a pattern of outputs of the magnetic sensors S1-S9 inputted by shifting operation of the operation knob 5, with the patterns memorized in the memory part 13, and determine the shift position of the operation knob 5, and send a result of the comparison and determination to the output part 15. Then, the output part 15 is configured to finally output a shift command signal to the vehicular transmission based on the identified position of the operation knob 5.

As shown in FIG. 6, of the magnetic sensors S4-S6 allocated to the home position H, the fourth magnetic sensor S4 and the fifth magnetic sensor S5 are allocate also to the first drive-side intermediate position H-Nd, and the fifth magnetic sensor S5 and the sixth magnetic sensor S6 are allocated also to the first reverse-side intermediate position H-Nr.

In view of the foregoing, the control unit 12 is configured such that in a situation where the operation knob 5 is returning to the home position H from the drive position D or the drive-side neutral position Nd, it is determined that the operation knob 5 has returned to the home position H, at a timing when the operation knob 5 passes through the first drive-side intermediate position H-Nd so that the fourth magnetic sensor S4 and the fifth magnetic sensor S5 are put in on-state, before actual return of the operation knob 5 to the home position H.

Similarly, the control unit 12 is configured such that in a situation where the operation knob 5 is returning to the home position H from the reverse position R or the reverse-side neutral position Nr, it is determined that the operation knob 5 has returned to the home position H, at a timing when the operation knob 5 passes through the first reverse-side intermediate position H-Nr so that the fifth magnetic sensor S5 and the sixth magnetic sensor S6 are put in on-state, before actual return of the operation knob 5 to the home position H.

In this way, the return of the operation knob 5 to the home position H is pre-read before actual completion of the return. This feature allows the following operations to be speedily performed without delay. This feature further serves to accurately determine the return of the operation knob 5 to the home position H even when one of the magnetic sensors S4-S6 allocated to the home position H is failed in a state of on-state failure or off-state failure.

As described above with reference to FIG. 6, there is no magnetic sensor commonly allocated among the drive position D, the drive-side neutral position Nd, the reverse-side neutral position Nr, and the reverse position R, except for the home position H, where each of them is allocated with a pair of magnetic sensors.

In addition, among the magnetic sensors S4-S6 allocated to the home position H, the fourth magnetic sensor S4 is allocated also to the drive-side neutral position Nd, and the sixth magnetic sensor S6 is allocated also to the reverse-side neutral position Nr. However, the fifth magnetic sensor S5 is allocated only to the home position H among the five set shift positions. Accordingly, combination of the fourth magnetic sensor S4 and the fifth magnetic sensor S5, and combination of the fifth magnetic sensor S5 and the sixth magnetic sensor S6 are not identical to any one of the combinations of magnetic sensors allocated to the remaining four shift positions D, Nd, Nr and R.

In view of the foregoing, the control unit 12 is configured to implement the determination of the four shift positions D, Nd, Nr and R by determining the selected shift position not only when both of the two allocated magnetic sensors are in on-state, but also when only one of the two allocated magnetic sensors is in on-state.

Similarly, with regard to identification of the home position H, the control unit 12 is configured to identify selection of the home position H not only when all of the three allocated magnetic sensors S4-S6 are in on-state, but also when only two of the three allocated magnetic sensors S4-S6 are in on-state.

In this way, even when one of the two sensors allocated to each of the drive range position D, the drive-side neutral position Nd, and the reverse-side neutral position Nr, and the reverse range position R is failed, selection of each of the four shift positions can be identified correctly. Also, when one of the magnetic sensors S4-S6 allocated to the home position H is failed, selection of the home position H can be identified correctly. In summary, even when one of the sensors allocated to each of the five shift positions is failed, selection of each of the five shift positions can be identified correctly, only based on the current sensing result.

Figure 18A:
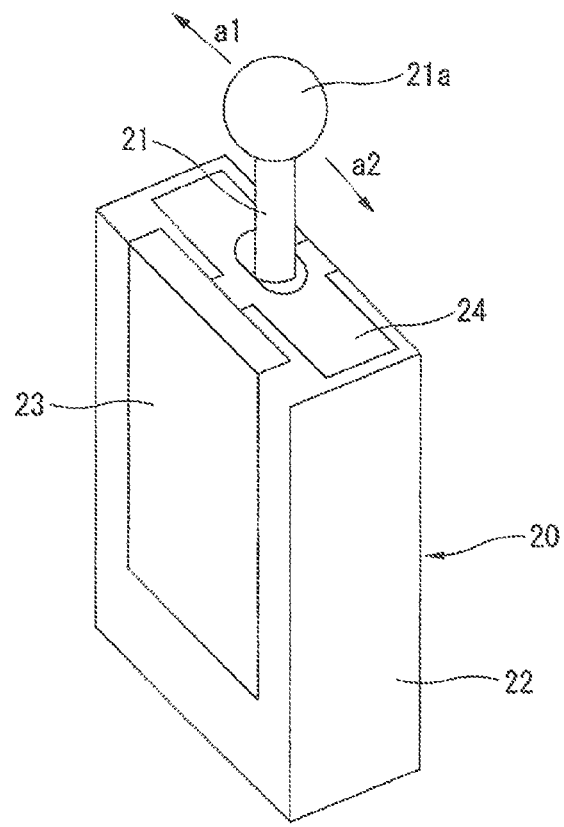
FIG. 18A is a perspective view of a vehicular shift apparatus of lever type according to a second embodiment of the present invention.
Figure 18B:
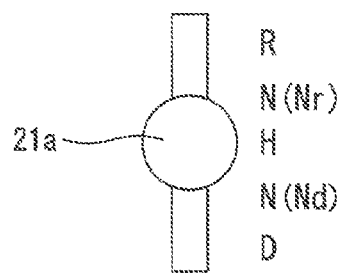
FIG. 18B is a schematic diagram showing a shift position pattern of the vehicular shift apparatus of FIG. 18A.
Figure 19:
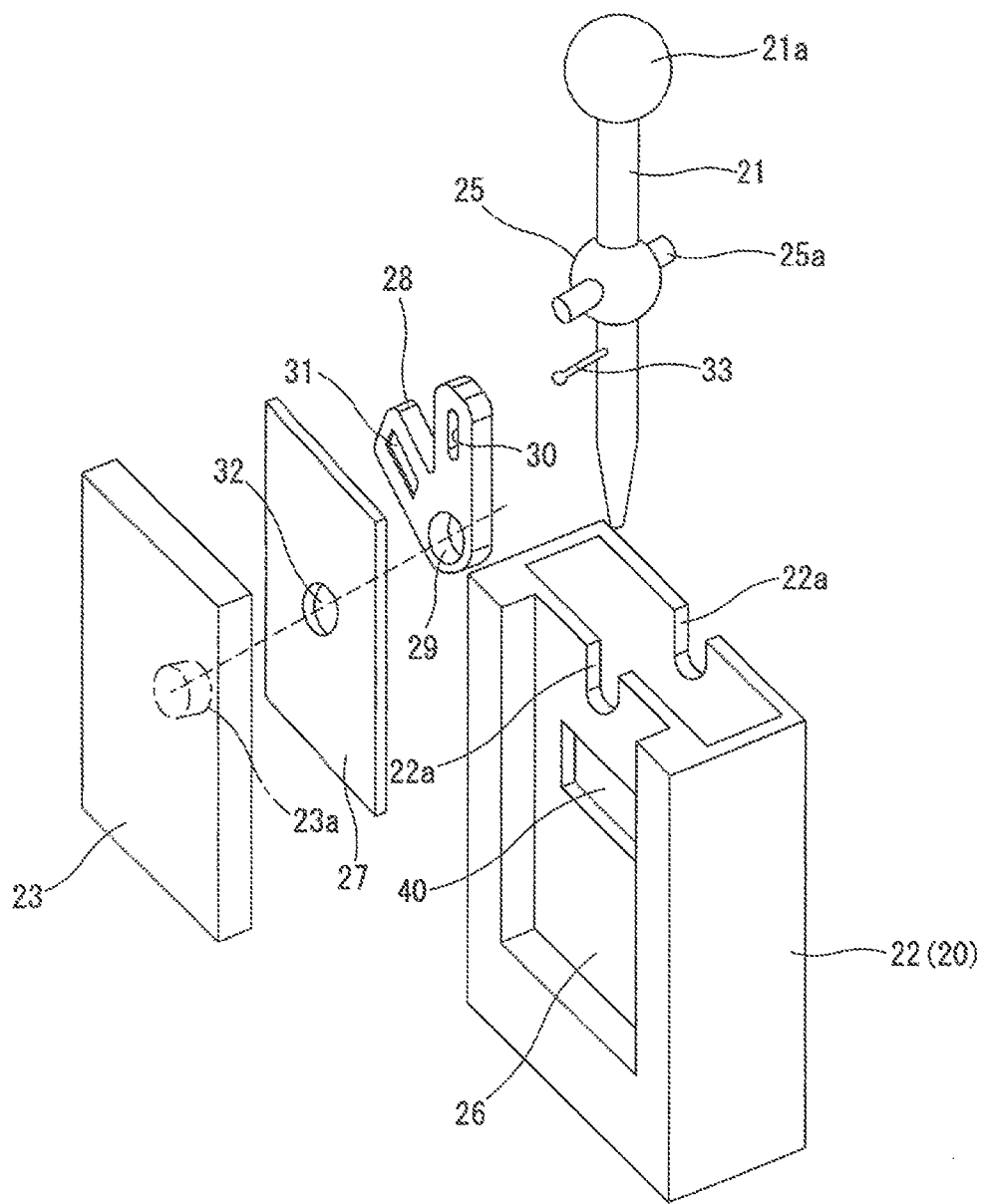
FIG. 19 is an exploded perspective view of the vehicular shift apparatus of FIG. 18A.

FIGS. 18A to 21E show a vehicular shift apparatus of lever type according to a second embodiment of the present invention. FIG. 18A shows the vehicular shift apparatus in a perspective view. FIG. 18B shows a shift position pattern of the vehicular shift apparatus of FIG. 18A. FIG. 19 shows an exploded perspective view of the vehicular shift apparatus.

As shown in FIG. 18A, the vehicular shift apparatus includes a case 20 and a shift lever 21 as an operation member. The case 20 has a box shape having a longitudinal axis extending vertically. The shift lever 21 projects from inside of the case 20 to outside of the case 20 through the top part of the case 20. The shift lever 21 includes a grasp portion 21a at its distal end, wherein the grasp portion 21a has a spherical shape. The shift lever 21 is rotatably supported by the case 20 to rotate or swing forward (as indicated by an arrow a1) and backward (as indicated by an arrow a2) in the vehicle longitudinal direction.

As shown in FIG. 18B, similar to the first embodiment, the shift lever 21 is provided with five set shift positions. The shift positions of the shift lever 21 include a home position H, a drive position D for forward drive, a reverse position R for reverse drive, a drive-side neutral position Nd as a first neutral position between the home position H and the drive range position D, and a reverse-side neutral position Nr as a second neutral position between the home position H and the reverse range position R.

Similar to the first embodiment, the shift lever 21 is configured to return immediately by itself to the home position H from any position other than the home position H, and self-retained in the home position H, when a force of shifting operation (or rotational operating force) is released from the shift lever 21. This mechanism is implemented by a spring not shown or the like.

The case 20 includes a case body 22, a side cover 23, and an upper cover 24. The case body 22 has a flat box shape. The side cover 23 is attached to one lateral face of the case body 22, and is in the form of a shallow rectangular plate. The upper cover 24 is attached to the top face of the case body 22.

As shown in FIG. 19, a lower half part of the shift lever 21 is disposed in the internal space of case body 22 from which the upper cover 24 is detached. The shift lever 21 is provided with a spherical part 25 at the center in the longitudinal direction. The spherical part 25 is provided with a rotary shaft portion 25a projecting in a lateral direction of the shift lever 21. The rotary shaft portion 25a is rotatably supported by bearing recesses 22a, 22a formed in edges of a top opening of the case body 22. After attachment of the upper cover 24 to the case body 22 to cover the spherical part 25, the shift lever 21 is supported to rotate or swing in the vehicle longitudinal direction with respect to the case body 22 by shifting operation.

The case body 22 has a lateral surface including an accommodating recess 26, in which a board 27 and a swing lever 28 having a V-shape are accommodated, and face each other, and are close to each other. These components are covered by attaching the side cover 23 to the case body 22. The accommodating recess 26 is defined and divided from the inside of the case body 22 by a division wall part including a window 40 at its central portion.

The swing lever 28 includes a shaft hole 29 and a slot 30, and a magnet 31 embedded therein, wherein the magnet 31 is a permanent magnet having a rectangular shape. The board 27 includes a shaft hole 32 at its central portion. The side cover 23, which is used to cover the board 27, includes a support shaft portion 23a in a central portion of its inside surface, wherein the support shaft portion 23a projects in the lateral direction and passes through the shaft hole 32 of the board 27 and the shaft hole 29 of the swing lever 28. With the configuration described above, after assembling the side cover 23 to the accommodating recess 26 of the case body 22, the support shaft portion 23a of the side cover 23 serves to center and position the board 27 with respect to the case body 22, and also support the swing lever 28 rotatably to allow the swing lever 28 to rotate or swing with respect to the case body 22.

The shift lever 21 provided with a link pin 33 located under the rotary shaft portion 25a. The link pin 33 is configured to be fitted in the slot 30 of the swing lever 28 through the window 40. When the shift lever 21 is moved in the vehicle longitudinal direction by shifting operation, the swing lever 28 rotates about the rotary shaft portion 25a at a predetermined lever ratio with respect to rotation of the shift lever 21.

The board 27 is provided with nine magnetic sensors S1-S9, wherein the magnetic sensors S1-S9 are placed on an inside surface of the board 27 facing the magnet 31 of the swing lever 28, and arranged as shown in FIG. 20A. The magnetic sensors S1-S9 are arranged along a trajectory of rotation or swing of the magnet 31, covering an area where the magnet 31 passes. Each magnetic sensor S1-S9 is a contactless-type sensing element such as a Hall-effect element. Each magnetic sensor S1-S9 is configured to be switched between on-state and off-state by relative movement (approaching or deviating) of the magnet 31 caused by shifting operation of the shift lever 21, and thereby output binary signals including an on-state signal and an off-state signal. When the shift lever 21 is put in a selected one of the shift positions, the selected shift position is identified based on combination of the signal outputs from the magnetic sensors S1-S9.

As shown in FIGS. 20A to 21E, when the shift lever 21 is rotated by shifting operation, the magnet 31 embedded in the swing lever 28 rotates or swings about the rotational axis of the support shaft portion 23a of the side cover 23, along with the shift lever 21.

FIG. 20A to 21E show arrangement of the magnetic sensors S1-S9, and show positions of the magnet 31 with respect to the magnetic sensors S1-S9 for conditions made by shifting operation of the shift lever 21. The magnet 31 is embedded in the swing lever 28, and rotated by shifting operation of the shift lever 21 to move in the direction opposite to the direction of movement of the grasp portion 21a of the shift lever 21, namely, in the direction of the arrow a12 in FIGS. 20A to 20E and in the direction of the arrow a11 in FIGS. 21A to 21E.

The configuration that the magnetic sensors S1-S9 are arranged in a plurality of lines is common with the configuration of the first embodiment shown in FIGS. 4A to 5E, wherein FIGS. 20A to 20E correspond to FIGS. 4A to 4E, and FIGS. 21A to 21E correspond to FIGS. 5A to 5E.

It is to be noted that the direction of the arrow a1 for movement of the shift lever 21 shown in FIG. 18 corresponds to the direction of the arrow a11 for movement of the magnet 31 of the swing lever 28 shown in FIGS. 21A to 21E, and that the direction of the arrow a2 for movement of the shift lever 21 shown in FIG. 18 corresponds to the direction of the arrow a12 for movement of the magnet 31 of the swing lever 28 shown in FIGS. 20A to 20E, because the direction of movement of the shift lever 21 (grasp portion 21a) is opposite to the direction of movement of the magnet 31 of the swing lever 28, as shown in FIG. 19.

The tables for combination of outputs of the magnetic sensors S1-S9 shown in FIGS. 6 to 16B for the first embodiment are also true for the second embodiment. The control unit 12 is also employed and configured as in the first embodiment. Accordingly, the vehicular shift apparatus of lever type according to the second embodiment functions and produces advantageous effects as the vehicular shift apparatus of knob type according to the first embodiment.

According to the present embodiments, the five shift positions and the four intermediate positions can be sensed by the nine sensing elements. Multiple position sensing for the vehicular shift apparatus is thus achieved. Moreover, safety of the shift-by-wire-type vehicular shift apparatus is enhanced by the feature of identifying the selected shift position only based on the current sensing result even when one of the sensing elements allocated to each shift position.

The entire contents of Japanese Patent Application 2016-054675 filed Mar. 18, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicular shift apparatus comprising:
   an operation member configured to be rotated by shifting operation, and put in a selected one of five set shift positions, wherein the five set shift positions include a home position, a drive position for forward drive, a reverse position for reverse drive, a drive-side neutral position, and a reverse-side neutral position, wherein the home position is between the drive position and the reverse position, wherein the drive-side neutral position is between the home position and the drive position, wherein the reverse-side neutral position is between the home position and the reverse position, and wherein the operation member is further configured to return to the home position by release of shifting operation;
   a magnet configured to be rotated along a trajectory by rotation of the operation member; and
   first, second, third, fourth, fifth, sixth, seventh, eighth, and ninth sensing elements placed on a board and arranged along the trajectory of the magnet, wherein the board faces the magnet, wherein each of the first to ninth sensing elements is configured to contactlessly sense the magnet by being in a first state in response to being close to the magnet, and wherein the first state indicates presence of the magnet;
   wherein:
   each of the first and second sensing elements is further configured to be in the first state in response to a condition where the operation member is in the drive position;
   each of the third and fourth sensing elements is further configured to be in the first state in response to a condition where the operation member is in the drive-side neutral position;
   each of the fourth, fifth, and sixth sensing elements is further configured to be in the first state in response to a condition where the operation member is in the home position;
   each of the sixth and seventh sensing elements is further configured to be in the first state in response to a condition where the operation member is in the reverse-side neutral position;
   each of the eighth and ninth sensing elements is further configured to be in the first state in response to a condition where the operation member is in the reverse position;
   each of the fourth and fifth sensing elements is further configured to be in the first state in response to a condition where the operation member is in a first drive-side intermediate position between the home position and the drive-side neutral position;
   each of the second and third sensing elements is further configured to be in the first state in response to a condition where the operation member is in a second drive-side intermediate position between the drive-side neutral position and the drive position;
   each of the fifth and sixth sensing elements is further configured to be in the first state in response to a condition where the operation member is in a first reverse-side intermediate position between the home position and the reverse-side neutral position; and
   each of the seventh and eighth sensing elements is further configured to be in the first state in response to a condition where the operation member is in a second reverse-side intermediate position between the reverse-side neutral position and the reverse position.

2. The vehicular shift apparatus as claimed in claim 1, further comprising a controller, wherein:
   the controller is configured to receive input of sensing outputs from the first to ninth sensing elements, and determine, depending on combination of the sensing outputs, where the operation member is positioned, and output a result of the determination; and
   the controller is further configured to determine that the operation member is in the home position, in response to a condition where each of the fourth and fifth sensing elements is in the first state, before the sixth sensing element is put into the first state, when the operation member is returning toward the home position from one of the drive position and the drive-side neutral position, and in response to a condition where each of the fifth and sixth sensing elements is in the first state, before the fourth sensing element is put into the first state, when the operation member is returning toward the home position from one of the reverse position and the reverse-side neutral position.

3. The vehicular shift apparatus as claimed in claim 2, wherein the controller is further configured to:
   determine that the operation member is in the drive position, in response to a condition where at least one of the first and second sensing elements is in the first state;
   determine that the operation member is in the reverse position, in response to a condition where at least one of the eighth and ninth sensing elements is in the first state;
   determine that the operation member is in the drive-side neutral position, in response to a condition where at least one of the third and fourth sensing elements is in the first state;
   determine that the operation member is in the reverse-side neutral position, in response to a condition where at least one of the sixth and seventh sensing elements is in the first state; and
   determine that the operation member is in the home position, in response to a condition where each of at least two of the fourth, fifth, and sixth sensing elements is in the first state.

4. The vehicular shift apparatus as claimed in claim 3, wherein:
   the fifth sensing element is disposed between the fourth sensing element and the sixth sensing element along the trajectory of the magnet;

the fourth sensing element and the sixth sensing element face each other along the trajectory of the magnet; and an interval between the fourth sensing element and the sixth sensing element is smaller than that between the first sensing element and the second sensing element, that between the third sensing element and the fourth sensing element, that between the sixth sensing element and the seventh sensing element, and that between the eighth sensing element and the ninth sensing element, along the trajectory of the magnet.

\* \* \* \* \*